US012682647B2

(12) United States Patent
Kim et al.

(10) Patent No.: US 12,682,647 B2
(45) Date of Patent: Jul. 14, 2026

(54) DIGITAL TWIN BASED VIDEO MONITORING METHOD

(71) Applicant: UINFRAWAY CO., LTD., Suwon-si (KR)

(72) Inventors: Dae Woong Kim, Suwon-si (KR); Jong Hoon Kim, Yongin-si (KR)

(73) Assignee: UINFRAWAY CO., LTD., Suwon-si (KR)

( * ) Notice: Subject to any disclaimer, the term of this patent is extended or adjusted under 35 U.S.C. 154(b) by 0 days.

(21) Appl. No.: 19/010,948

(22) Filed: Jan. 6, 2025

(65) Prior Publication Data

US 2025/0252746 A1     Aug. 7, 2025

(30) Foreign Application Priority Data

Feb. 7, 2024     (KR) ......................... 10-2024-0018600

(51) Int. Cl.
*G06V 20/52*          (2022.01)

(52) U.S. Cl.
CPC ................................... *G06V 20/52* (2022.01)

(58) Field of Classification Search
CPC ........ H04N 7/181; H04N 7/18; G08B 13/196; G08B 13/19645; G08B 13/19641; G08B 13/19643; G06T 7/20; G06T 2207/30232; G06V 20/52
USPC ................................. 348/143, 151, 153, 156
See application file for complete search history.

(56) References Cited

U.S. PATENT DOCUMENTS

| | | | |
|---|---|---|---|
| 8,934,026 B2 * | 1/2015 | Tian ................... | H04N 21/6547 |
| | | | 348/143 |
| 2010/0141762 A1 * | 6/2010 | Siann ................... | H04N 23/661 |
| | | | 348/143 |

FOREIGN PATENT DOCUMENTS

| | | |
|---|---|---|
| KR | 10-2340815 B1 | 12/2021 |
| KR | 10-2351980 B1 | 1/2022 |
| KR | 10-2398066 B1 | 5/2022 |
| KR | 10-2022-0082567 A | 6/2022 |
| KR | 10-2022-0114666 A | 8/2022 |

* cited by examiner

*Primary Examiner* — Sherrie Hsia
(74) *Attorney, Agent, or Firm* — NSIP Law

(57)          ABSTRACT

The present invention relates to a video monitoring method in an area where a plurality of CCTV cameras is installed, such as an urban area. As a digital twin Cyber Physical System (CPS) is constructed, and a control server connected to a camera and a computer connected to the control server are configured, and a model object generated from a CPS model and video information transmitted from the camera are collected in the control server and transmitted to the computer, users may confirm a digital twin-based model object together with actually captured video information. Through the present invention, it is possible to immediately and clearly confirm surrounding spaces, as well as the location of a camera transmitting specific video information in video monitoring of a wide area such as urban areas, and efficiency and accuracy of viewing the video information of a plurality of cameras can be dramatically improved.

2 Claims, 9 Drawing Sheets

DIGITAL TWIN BASED VIDEO MONITORING METHOD

CROSS-REFERENCE TO RELATED APPLICATION(S)

This application claims the benefit under 35 USC 119(a) of Korean Patent Application No. 10-2024-0018600, filed with the Korean Intellectual Property Office on Feb. 7, 2024, the disclosure of which is incorporated herein by reference in its entirety.

BACKGROUND OF THE INVENTION

Field of the Invention

The present invention relates to a video monitoring method in an area where a plurality of CCTV cameras 50 is installed, such as an urban area, a large building, or the like. As a digital twin Cyber Physical System (CPS) is constructed, and a control server 30 connected to a camera 50 and a computer 10 connected to the control server 30 are configured, and a model object 18 generated from a CPS model 41 and video information 17 transmitted from the camera 50 are collected in the control server 30 and transmitted to the computer 10, users may confirm a digital twin-based model object 18 together with actually captured video information 17.

Background of the Related Art

As digital twin techniques, which replicate real objects, such as facilities, structures, buildings, and the like that already exist in reality or are planned to be installed or constructed, as a digital data model and exchange information through communication between real object detection means and the digital data model, are developed and spread, digital twin-based or linked techniques are utilized in various industrial fields.

As digital twin is the digital data model described above, and is configured of a Cyber Physical System (CPS), which is constructed by merging detailed specification information into a 3D model having a shape and a structure the same as those of real objects, and a communication path, which is a path for exchanging information with objects in the real world, i.e., a communication network that performs communication with sensors mounted on various structures, facilities, or the like, and mainly used for grasping the status of large structures or facilities, grasping information on the history and plan, and performing remote inspection or simulation, it can be said that most of the functions are concentrated on the Cyber Physical System (CPS) among the components of the digital twin.

Actual application areas of the CPS and the digital twin technique may include management and monitoring works of large facilities or urban areas, and in the case of urban areas with a plurality of buildings and roads, large-scale multi-use facilities, or large buildings, it is unable or significantly limited to conduct physical experiments or actual trial use in the overall plan, design, construction, use, and maintenance. Therefore, when planning, simulated operation, and maintenance are applied through appropriate use of the digital twin CPS, various effects, such as secured safety, increased convenience, and the like, can be expected, in addition to the advantages in the economic aspect.

Accordingly, various techniques combining digital twins are developed in management and monitoring works for various large structures and urban facilities, and as a related prior art, there is U.S. Pat. No. 2,398,066, which is a facility monitoring method.

SUMMARY OF THE INVENTION

Conventional digital twin-based facility monitoring techniques, including U.S. Pat. No. 2,398,066, may be a technique of confirming operational status, deformation, or breakage of monitoring target facilities by constricting a CPS model corresponding to a monitoring target facility, connecting monitoring equipment such as cameras or sensors to the CPS model, and continuously operating the CPS model on the basis of information transmitted from the monitoring equipment.

That is, although the conventional digital twin-based facility monitoring techniques are techniques for monitoring soundness of facilities themselves and effective in real-time confirmation of detailed status of the facilities, they are inevitably disadvantageous in monitoring inside the facilities or surrounding situations, rather than the facilities themselves.

For example, assuming control works of monitoring accidents, disasters, or crimes in a monitoring target facility or area on the basis of video information in a plurality of scattered points, as conventional digital twin-based monitoring techniques are focused on confirming the status of the facility itself, it is unable to obtain practical advantages in comparison with traditional CCTV-based control.

Particularly, in the prior art that requires frequent operation of a CPS model using information transmitted from monitoring equipment connected to a facility, as the actual monitoring effect is extremely low compared to computer resources consumed in the system operation process, the limitation in economic feasibility and efficiency is clear.

In consideration of the problems, the present invention has been conceived to strengthen the connectivity with video information 17 and improve the efficiency of monitoring and control works, while minimizing operation of a CPS model 41, and there is provided a digital twin-based video monitoring method comprising: a model transmission step (S11) of generating a model object 18 by operating the CPS model 41, and transmitting the model object 18 to the control server 30 by the CPS server 40 in response to a request of the control server 30; an object conversion step (S12) of generating, by the control server 30, a camera object 15 by processing the transmitted model object 18; a basic output step (S21) of transmitting the model object 18 and the camera object 15 by the control server 30 in response to a request for a viewing program of the computer 10 and outputting both the model object 18 and the camera object 15 by the viewing program; a point selection step (S30) of transmitting, as the camera object 15 is selected, identification information among characteristic information of the camera object 15 to the control server 30 by the viewing program of the computer 10; and a video output step (S40) of transmitting video information 17 corresponding to the identification information to the computer 10 by the control server 30, and outputting the video information 17 by the viewing program of the computer 10.

In addition, the present invention provides a digital twin-based video monitoring method, in which at the point selection step (S30), when the viewing program of the computer 10 transmits the identification information and collimation information among the characteristic information of the camera object 15 to the control server 30 as the camera object 15 is selected, the control server 30 transmits the identification information and the collimation information to the CPS server 40, and the CPS server 40 generates a model object 18 and an area object 16 by operating the CPS model 41 using the identification information and the collimation information and transmits the objects to the control server 30, and at the video output step (S40), the control server 30 transmits the video information 17, the model object 18, and the area object 16 corresponding to the identification information to the computer 10, and the viewing program of the computer 10 outputs the video information 17 into the area object 16.

DETAILED DESCRIPTION OF THE PREFERRED EMBODIMENT

The detailed configuration and implementation process of the present invention will be described below through the accompanying drawings.

Figure 1:
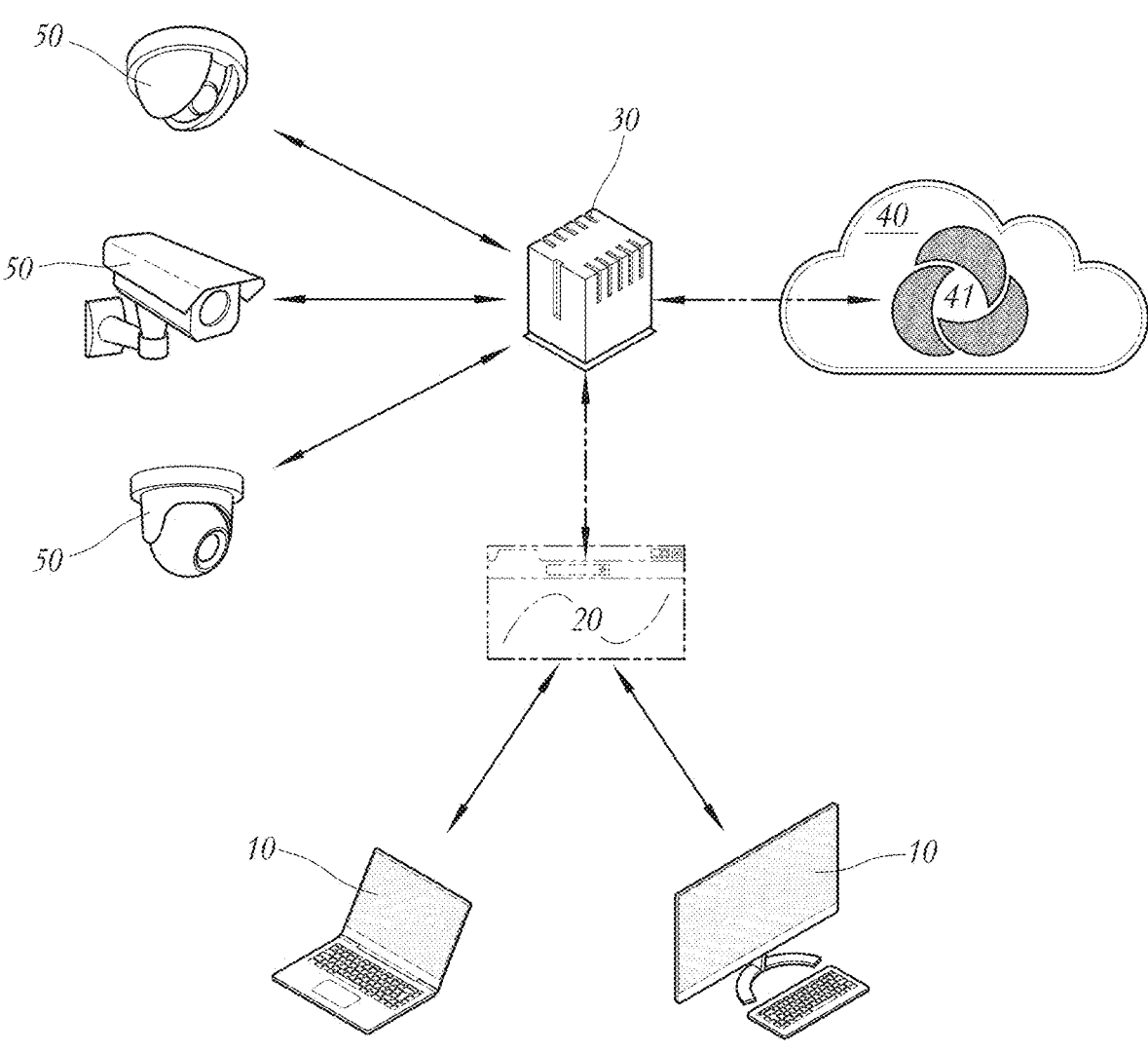
FIG. 1 is a view showing the system configuration of the present invention.

First, FIG. 1 is a view showing the configuration of components constituting a system that performs the present invention and the connection relation between the components, and as shown in the drawing, the present invention is an information device directly operated by a user, and is performed by a computer 10 connected to a control server 30 through a communication network such as the Internet or directly connected to the control server 30 through a dedicated line, the control server 30 connected to a plurality of CCTV cameras 50, and a Cyber Physical System (CPS) server 40 equipped with a CPS model 41 and connected to the control server 30.

As shown in FIG. 1, the control server 30 is a server connected to a plurality of cameras 50, i.e., monitoring CCTV cameras 50, to receive video information 17 captured by these cameras 50, and control the cameras 50, which is a server operated by an entity that performs the work of controlling monitoring target urban areas, large buildings, or the like. The computer 10 connected to the control server 30 is an information device directly operated by a user as described above and performs a function of outputting the video information 17 of the camera 50 transmitted from the control server 30 and a function of transmitting control commands to the control server 30 according to the user's intention, and therefore, the user of the computer 10 may be regarded as a person in charge of performing the control works.

Although the control server 30 and the computer 10 are configured as separate information device hardware connected through a communication network in FIG. 1, in the present invention, the control server 30 and the computer 10 are entities that act as a server and a client, respectively, and may be constricted as software on the same hardware.

However, when the control server 30 and the computer 10 constitute a client-server system and are configured in a state of connecting separate hardware devices through a communication network as shown in FIG. 1, a plurality of users may utilize the control server 30, and various functions, in addition to management of the cameras 50, may also be given to the control server 30. Particularly, as shown by imaginary lines in FIG. 1, when a web server function is given to the control server 30, or a webpage 20 controlled by the control server 30 is constructed by connecting a separate web server in a hardware or software form although not specified in the drawing, easy access to the control server 30 is possible by utilizing a general computer 10 equipped with a browser and the Internet.

Particularly, in processing the video information 17 and transmitting control commands, which are mainly performed in information processing between the control server 30 and the computer 10, all the processes of the present invention described below can be smoothly performed using only a browser widely distributed to general personal computers 10 without installing a separate dedicated application program in the computer 10, through the configuration of the webpage 20 that mediates the control server 30 and the computer 10.

The connection relation between the computer 10 and the control server 30 described above can be equally applied to the connection relation between the control server 30 and the CPS server 40, and the CPS server 40 is also constructed as an independent entity having hardware separate from the control server 30 and may be connected through a communication network such as the Internet or the like, and the CPS server 40 and the control server 30 may also be constructed in the same hardware.

The CPS server 40 and the control server 30 separately act as a server and a client in carrying out the present invention. The CPS server 40 operates the CPS model 41 mounted thereon and provides information such as the model object 18 and the like to the control server 30 in response to a request of the control server 30, and when the control server 30 requests the CPS server 40 to operate the CPS model 41, it provides basic condition information needed for operating the CPS model 41.

In conclusion, the connection between the components of the present invention shown in FIG. 1 means a logical connection, not a physical connection. All the webpage 20, the control server 30, and the CPS server 40 may be constructed in a single server hardware in the form of individual server programs, and each server program may be constructed to be physically separated in different server hardware or storage. As shown in the drawing, the CPS server 40 may be implemented in various forms, such as being constructed in the basis of cloud computing.

In particular, in the connection between the control server 30 and the CPS server 40, the control server 30 may be referred to as a server program having a multi-purpose characteristic from the perspective of a client-server system, acting as a client for the CPS server 40 and the cameras 50 to which IP cameras are applied although it acts as a server for the computer 10, and as described above, as the control server 30 and the CPS server 40 may be constructed in the same device or in different devices, the control server 30 and the CPS server 40 do not necessarily need to be operated by the same entity.

That is, in carrying out the present invention, the CPS model 41 constructed in the CPS server 40 may be directly constructed by an entity that performs the present invention, or a CPS model 41 previously constructed by another person may also utilized, and particularly, in the case of monitoring targets previously constructed by a public CPS model 41, such as urban areas or public facilities, the present invention may be smoothly carried out only with a previously constructed CPS model 41 without constructing a new CPS model 41 to carry out the present invention.

In the present invention, as the video information 17 transmitted from the cameras 50 is collected by the control server 30 and finally transmitted to the computer 10 and output, and also the model object 18 generated by the CPS model 41 mounted on the CPS server 40 is finally transmitted to the computer 10 via the control server 30 and output, an application program that can communicate with the control server 30 and process and output the video information 17 and the model object 18 transmitted from the control server 30 needs to be mounted on the computer 10, and in the present invention, this is referred to as a viewing program.

Although this viewing program may be developed as a separate dedicated program specialized for the functions described above, a general browser may be employed as the viewing program and perform the functions described above.

Here, the browser mounted on the computer 10 is a general commercial browser, which is capable of performing the present invention and viewing general web-based electronic documents on the Internet sites. However, a plug-in program capable of processing and outputting the video information 17 and processing and outputting products of the digital twin CPS model 41 can be mounted, or modification of the browser may be preceded in the form of function patches, sub-programs, or program modules of the browser, and despite the modification of a general browser, the browser used in the present invention is modified on the basis of a general commercial browser, and it can be said that the browser's identity as a processor of web standards information is maintained.

In the present invention, the CPS model 41 constructed in the CPS server 40 is constructed by combining the locations, shapes, structures, and specification information of structures constituting a monitoring target, i.e., an urban area of a monitoring target area or a large building to be monitored, and the CPS model 41 generates the model object 18 in the form of a three-dimensional model displayed in a visual form under the control of the CPS server 40.

In addition, in the present invention, the cameras 50 generating the video information 17 by actually photographing actual monitored target objects are digital photographing devices embedded with a digital imaging device, and transmit the captured video information 17 to the control server 30, and the control server 30 contains characteristic information set for each camera 50, and the characteristic information of each camera 50 includes identification information and collimation information.

The identification information included in the characteristic information is unique information given to each camera 50 to identify each camera 50, and the control server 30 may grasp the source of the received video information 17 and the location of the camera 50 that has captured the video information 17 through the identification information. The collimation information included in the characteristic information together with the identification information is information that can specifies an actual photographing area of the camera 50, in addition to the viewpoint, line of sight, and angle of view of the camera 50, and a spatial area actually photographed by a corresponding camera 50 may be accurately specified through the collimation information.

Figure 2:
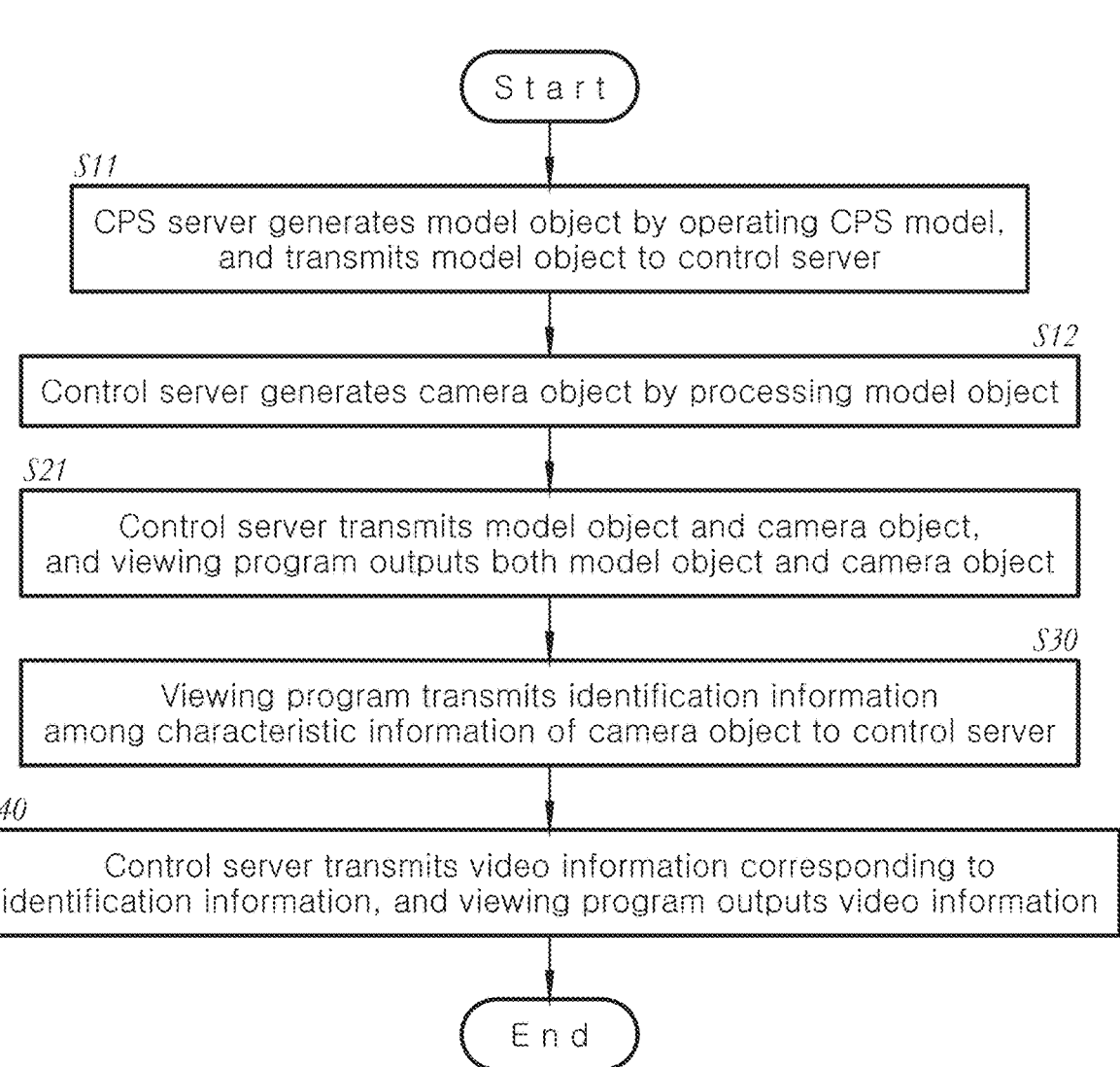
FIG. 2 is a flowchart illustrating the present invention.

As described above, the present invention provides a digital twin-based video monitoring method performed by a system configured of a CPS server 40 including a CPS model 41 constructed therein, a control server connected to a plurality of cameras 50 to receive video information 17 and connected to the CPS server 40, and a computer 10 connected to the control server 30 and equipped with a viewing program, and as shown in FIG. 2, it begins with a model transmission step (S11) of generating a model object 18 by operating the CPS model 41, and transmitting the model object 18 to the control server 30 by the CPS server 40 in response to a request of the control server 30.

The CPS model 41 is a three-dimensional model established for monitoring targets managed by the operating entity of the control server 30, i.e., facilities of urban areas or large buildings, and the locations, shapes, structures, and specifications of the structures, members, and various attachments constituting the monitoring targets are recorded in the memory device of the control server 30 as three-dimensional information to form the CPS model 41.

Particularly, each camera 50 included in the monitoring targets is also included in the CPS model 41 as a structure or an attachment, and more specifically, each camera 50 included in the CPS model 41 may be generated as a model object 18 by the CPS model 41.

At the model transmission step (S11), the request of the control server 30 is to initiate a process of generating a model object 18 in a monitoring target as the CPS server 40 operates the CPS model 41, and at the same time, it means a process of transmitting information specifying a regional range or a building that sets a monitoring target or a monitoring target area to the CPS server 40 by the control server 30. Here, the process of specifying a monitoring target area or building is not a separately established model as the CPS model 41 is specialized for performing the present invention, but a process that is necessarily required when the present invention borrows a CPS model 41 previously constructed for general or other purpose, such as a public CPS or the like.

When the model transmission step (S11) is performed, an object conversion step (S12) of generating, by the control server 30, a camera object 15 corresponding to the characteristic information described above by processing the transmitted model object 18 is performed. Here, generating a camera object 15 is a process of selecting a model object 18 corresponding to the camera 50 among all model objects 18 generated by the CPS model 41 and assigning a special status, and it aims at efficient processing of the control server 30 and the computer 10, identification of a user, and convenience of operation, considering that the overall process of performing the present invention described below is carried out on the basis of information transmitted from the camera 50 or information given to the camera 50.

Figure 3:
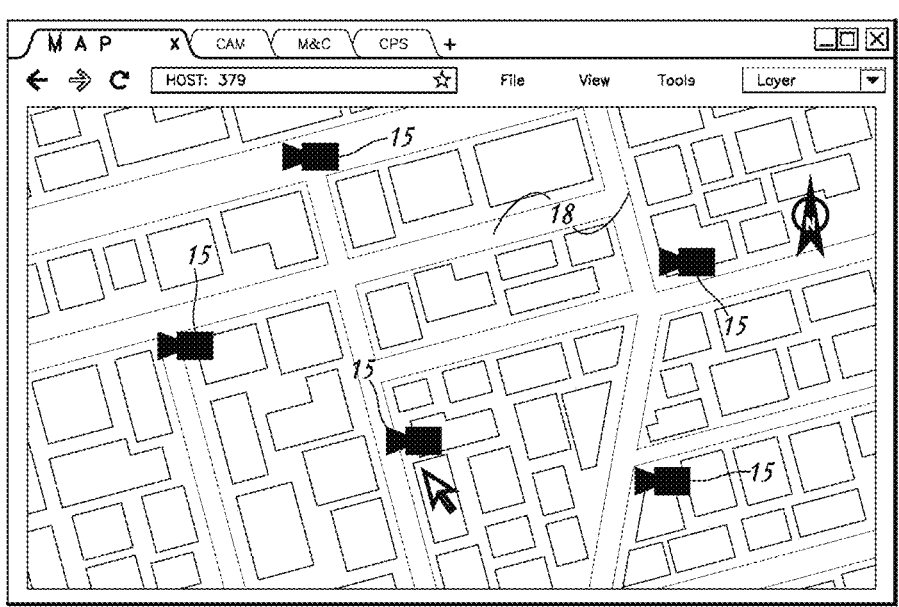
FIG. 3 is an exemplary view showing a computer screen when a basic output step of the present invention is performed.
Figure 4:
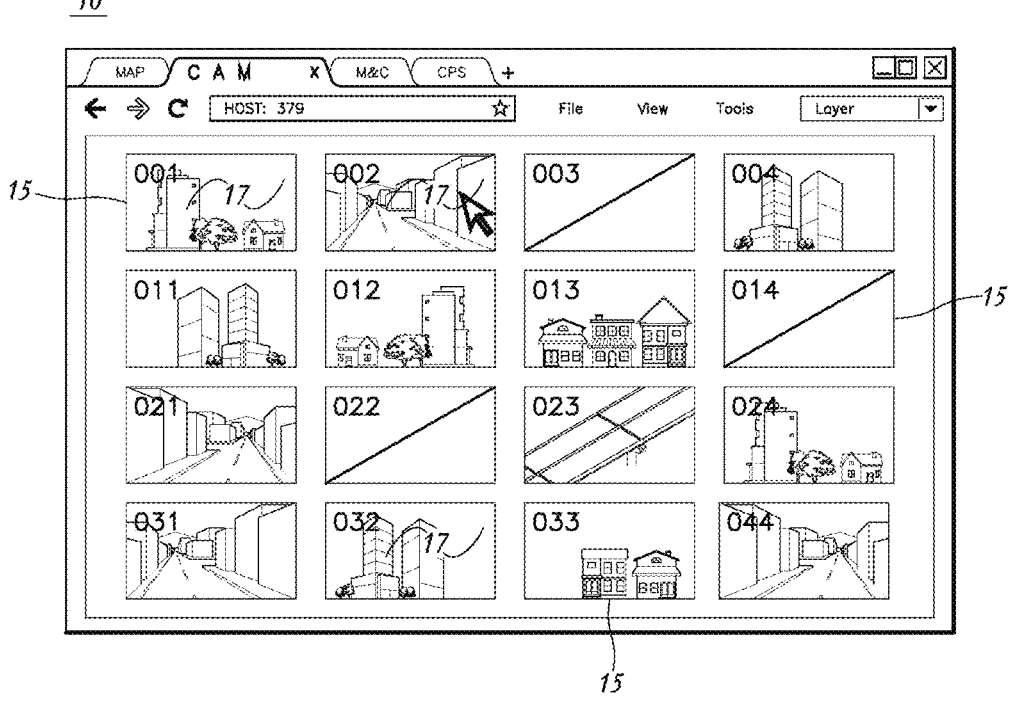
FIG. 4 is an exemplary view showing a computer screen when a modified basic output step of the present invention is performed.

When the object conversion step (S12) is completed, a basic output step (S21) of transmitting the model object 18 and the camera object 15 by the control server 30 in response to a request for a viewing program of the computer 10 and outputting both the model object 18 and the camera object 15 by the viewing program is performed, and an example of the screen of the computer 10 on which the basic output step (S21) has been performed is shown in FIGS. 3 and 4.

Like the meaning in the dictionary, the basic output step (S21) is a step of providing fundamental information to the user to carry out the present invention described below, and a means for confirming each of the cameras 50 scattered in the monitoring target, together with general information on the monitoring target, is shown in FIG. 3.

In the embodiment shown in FIG. 3, the present invention is applied when the monitoring target is an urban area, and a floor plan of the urban area with marks for confirming the locations of the cameras 50 is displayed on the screen of the computer 10. Here, the floor plan of the urban area may be implemented only through an extremely simple process of simplifying a three-dimensional model object 18 generated by the CPS model 41 into a two-dimensional model object 18, and the camera object 15 may also be simplified in the form of a mark described above to confirm only its location.

Meanwhile, FIG. 4 is a view showing an embodiment of configuring a camera object 15 as a video output element in the form of a thumbnail and implementing on the screen of the computer 10, which is configured in the form of a traditional control screen familiar to users by arranging camera objects 15, which is an output element of a thumbnail image, in order of serial number, instead of omitting or hiding the model object 18, other than the camera object 15, from the output of the screen of the computer 10.

Subsequently, as shown in FIG. 2, a point selection step (S30) of transmitting, as the camera object 15 is selected, the identification information among the characteristic information of the camera object 15 to the control server 30 by the viewing program of the computer 10 is performed. The point selection step (S30) is performed as the user selects the camera object 15 on the screen of the computer 10 by clicking or touching while the basic output step (S21) described above is performed. After the point selection step (S30), a video output step (S40) of transmitting video information 17 corresponding to the identification information to the computer 10 by the control server 30, and outputting the video information 17 by the viewing program of the computer 10 is performed.

Figure 5:
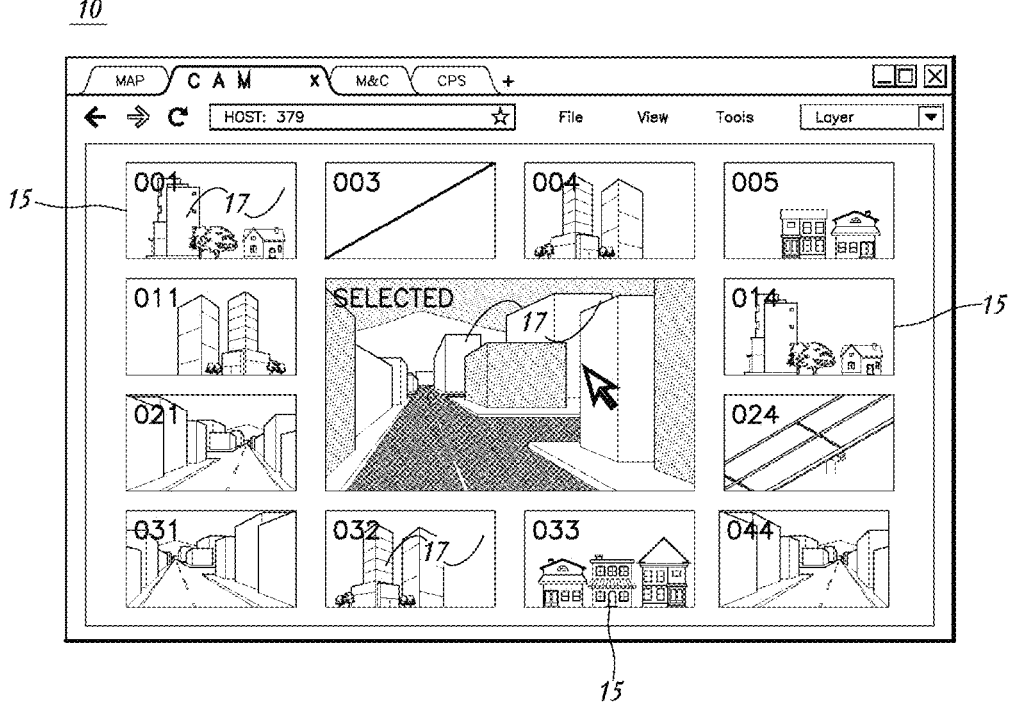
FIG. 5 is an exemplary view showing a computer screen when a point selection step and a video output step of the present invention are performed.
Figure 6:
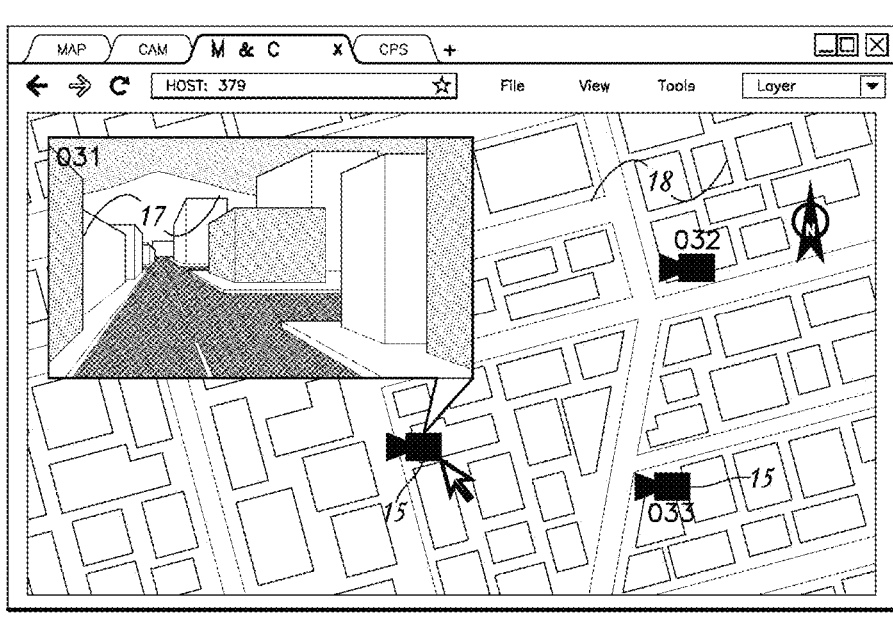
FIG. 6 is an exemplary view showing a computer screen when a point selection step and a video output step of the present invention including model objects are performed.

The screen of the computer 10 in a situation of performing the point selection step (S30) and the video output step (S40) is shown in FIGS. 5 and 6. FIG. 5 shows a view of outputting video information 17 transmitted from a corresponding camera 50 as the user selects a specific thumbnail, i.e., the camera object 15, from the screen of the basic output step (S21) of a traditional control screen form as shown in FIG. 4 described above, through an enlarged screen located at the center of the screen of the computer 10, which is a control screen. FIG. 6 shows a view of outputting video information 17 transmitted from a corresponding camera 50 in the form of a pop-up screen connected to the camera object 15 as the user selects the camera object 15 displayed together with the model object 18 while the model object 18 in the monitoring target area is output on the screen of the computer 10 without being hidden or omitted.

In the embodiment as shown in FIG. 5, when the model object 18 and the camera object 15 are output together on the screen of the computer 10, as the user may accurately grasp the location of each of the cameras 50 scattered in the spatial area of the monitoring target, and immediately confirm in real time the actual video information 17 transmitted from each camera 50 at the same time, efficiency and convenience of the control work can be improved.

Particularly, when the model object 18 and the camera object 15 are implemented simultaneously, it is possible to select only an object corresponding to the camera 50 among the model objects 18 and process the object by simply assigning the status of the camera object 15 by the control server 30, not the CPS server 40, without any modification or change of information on the model object 18 in the CPS model 41 as described above, and thus it does not need to modify or update the CPS model 41 in a large scale, and the computational and communication load involved in processing the model object 18 can be reduced greatly.

Figure 7:
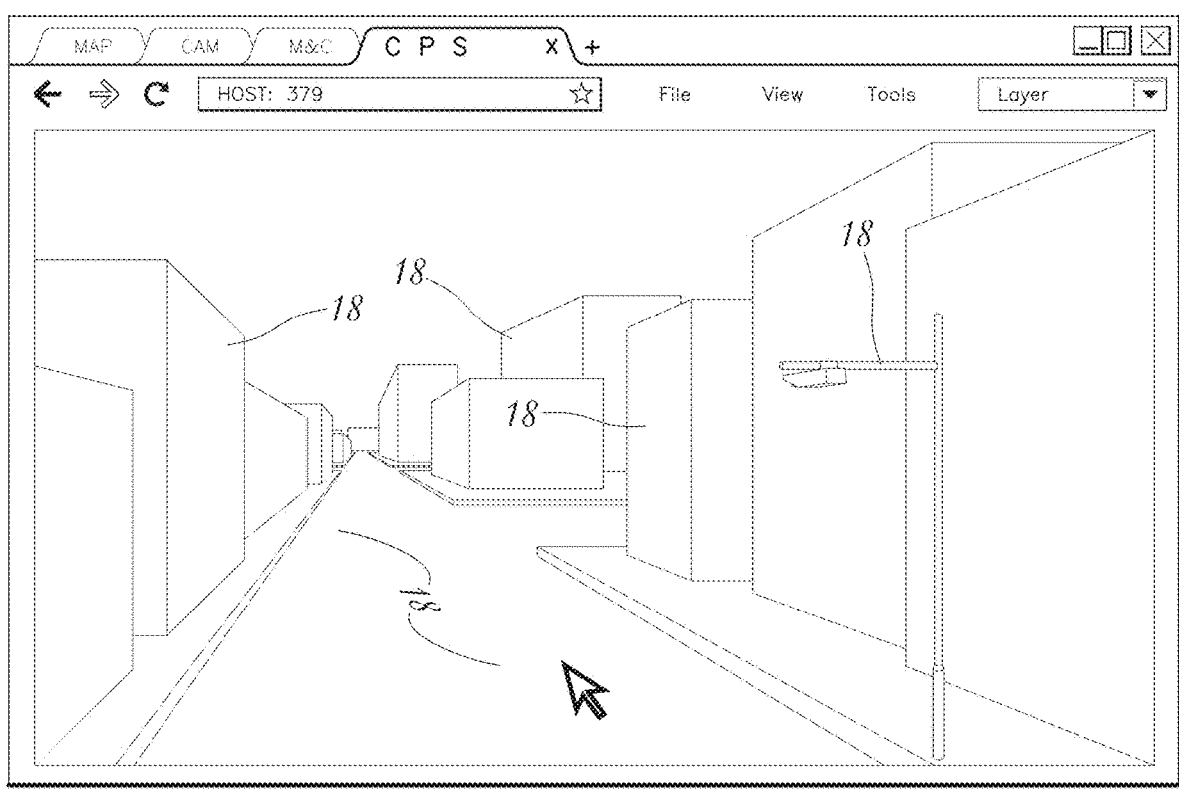
FIG. 7 is an exemplary view showing a computer screen of the present invention on which model objects are output.
Figure 8:
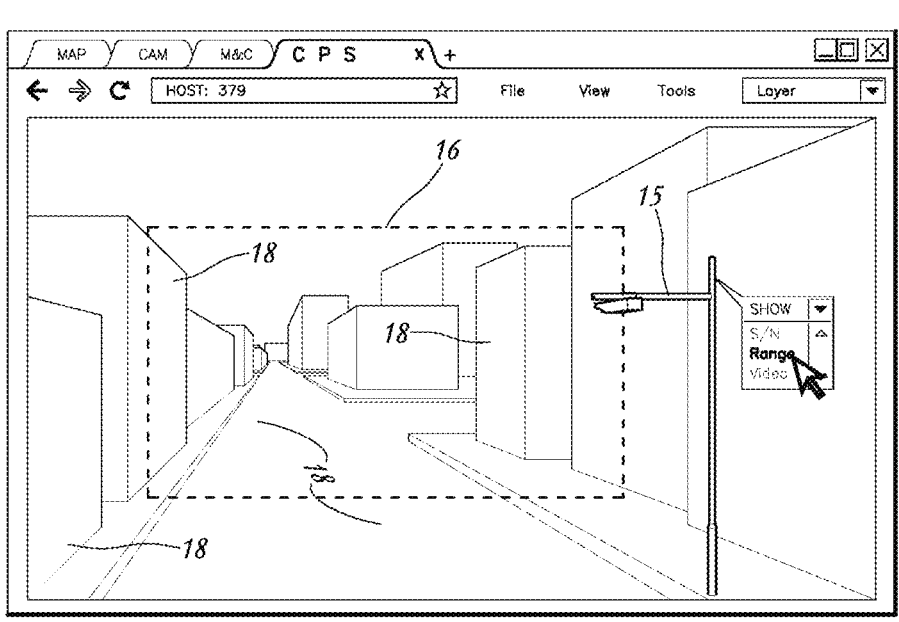
FIG. 8 is an exemplary view showing a computer screen of the present invention on which an area object is output together with model objects.
Figure 9:
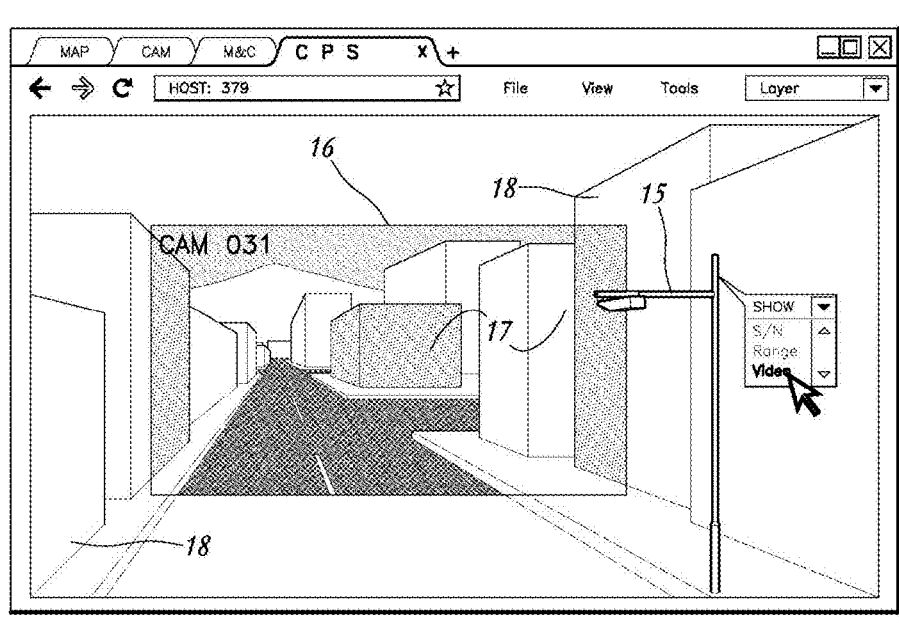
FIG. 9 is an exemplary view showing a computer screen of the present invention on which video information in an area object is output.

FIGS. 7 to 9 show an embodiment that outputs model objects 18 on the screen of the computer 10 three-dimensionally on the basis of the line of sight of the user or the line of collimation of the camera 50, not two-dimensionally in the form of a flat map. As a result, more realistic model objects 18 and video information 17 can be provided to the user, and an experience similar to actually performing an activity by the user inside the monitoring target can be provided.

First, FIG. 7 is a view showing a state in which only model objects 18 are output three-dimensionally on the screen of the computer 10 of the present invention. Through the screen, a screen similar to actually performing an activity by the user inside the monitoring target can be provided, and the viewpoint of the user on the model objects 18 may also be moved by handling the cursor or the like on the screen.

FIG. 8 is a view showing the screen of the computer 10 at the basic output step (S21), in which the user is allowed to select or manipulate a camera object 15 as the control server 30 changes a model object 18 corresponding to the camera 50 among the model objects 18 to a camera object 15 as described above, and the user may confirm information assigned to a corresponding camera object 15 by clicking the camera object 15, which is a three-dimensional object, or confirm the video information 17 transmitted from a camera 50 corresponding to the camera object 15.

Particularly, as shown in FIG. 8, as the user manipulates the camera object 15, an area object 16 specifying an area captured by a corresponding camera 50 may be output on the screen of the computer 10, and this is performed at the point selection step (S30) described above. This is progressed in a way that when the viewing program of the computer 10 transmits the identification information and collimation information among the characteristic information of the camera object 15 to the control server 30 as the camera object 15 is selected, the control server 30 transmits the identification information and the collimation information to the CPS server 40, and the CPS server 40 generates a model object 18 and an area object 16 by operating the CPS model 41 using the identification information and the collimation information and transmits the objects to the control server 30.

Here, the collimation information is information including the viewpoint, line of sight, and angle of view of the camera 50 as described above. When a 3D area object 16 is generated as the information is input into the CPS model 41, an area object 16 of a shape the same as that of a subject actually photographed by the camera 50 can be derived, as well as specifying an area actual photographed by the camera 50. As shown in FIG. 8, a photographed area the same as a video transmitted from a camera 50 corresponding to the camera object 15 may be displayed as the area object 16 in the space on the screen configured of a plurality of three-dimensionally output area objects 16.

Particularly, as shown in FIG. 9, when video information 17 corresponding to the camera object 15 is output inside the area object 16, a more realistic screen can be implemented. This is performed as the control server 30 transmits the video information 17, the model object 18, and the area object 16 corresponding to the identification information to the computer 10, and the viewing program of the computer 10 outputs the video information 17 into the area object 16 at the video output step (S40) described above.

In this way, as the model object 18 generated by the CPS model 41 and the video information 17 actually transmitted from the camera 50 are output together to match the actual situation and reality as shown in FIG. 9, user's sense of reality can be improved dramatically, and an experience similar to performing a virtual patrol inside a monitoring target can be provided.

Describing by assuming an actual process of using the present invention, a user performing an urban area control work may perform a virtual patrol along the model objects 18 generated on the screen to be identical to the monitoring target urban area by handling the cursor on the screen of the computer 10 as shown in FIG. 8. When the camera object 15 is displayed on the screen in this situation, i.e., when the user moves around the camera object 15 in the virtual patrol situation, screen information in the model object 18 and the area object 16 can be confirmed simultaneously as shown in FIG. 8 by clicking the camera object 15.

Accordingly, as described above, the user may have an experience similar to actually patrolling a monitoring target area and may completely understand the surrounding terrain as well as the camera 50, getting out of conventional techniques of simply confirming the location of the cameras 50 and the transmitted video, and particularly, this process may be repeated frequently within a control room without actually visiting a site.

As a result, efficiency and accuracy of video monitoring work itself can be secured, and when an emergency situation such as an accident, disaster, or crime occurs, the location and state of the emergency situation can be quickly and accurately grasped. In addition, the impact on the emergency site and the surrounding areas can be determined and countermeasures can be established quickly and accurately.

Through the present invention, it is possible to immediately and clearly confirm surrounding spaces, as well as the location of a camera 50 transmitting specific video information 17 in video monitoring of a wide area such as large buildings or urban areas, and efficiency and accuracy of viewing the video information 17 of a plurality of cameras 50 can be dramatically improved.

In addition, a service specific to CCTV cameras 50 and specialized for processing video information 17 can be provided with minimal information conversion, while fully utilizing a previously constructed CPS of digital twin, and as this information conversion process does not require any modification or update of the CPS of digital twin, monitoring works can be improved effectively even with a simple system, and related system construction costs may also be reduced.

Particularly, as the CPS model 41 is operated using the collimation information among the characteristic information of an individual camera 50, and a result of the operation and actually captured video information 17 are provided simultaneously, user's sense of reality can be improved dramatically. In addition, as a widely expanded surrounding area can be grasped practically only with the video information 17 transmitted from the camera 50 for a restricted area, it is possible to quickly and accurately respond when an abnormal situation such as an accident, disaster, or crime occurs.

In addition, unlike the prior art accompanied with real-time changes in each model object 18 constituting the CPS, as the operation of the CPS model 41 is minimized and the model object 18 itself is not changed in the present invention, computer resources required for providing the service can be reduced significantly.

DESCRIPTION OF SYMBOLS

10: Computer
15: Camera object
16: Area object
17: Video information
18: Model object
20: Webpage
30: Control server
40: CPS server
41: CPS model
50: Camera
S11: Model transmission step
S12: Object conversion step
S21: Basic output step
S30: Point selection step
S40: Video output step

What is claimed is:

1. A digital twin-based video monitoring method performed by a system configured of a CPS (Cyber Physical System) server 40 including a CPS model 41 constructed therein, a control server connected to a plurality of cameras 50 to receive video information 17 and connected to the CPS server 40, and a computer 10 connected to the control server 30 and equipped with a viewing program, the method comprising:

a model transmission step (S11) of generating a model object 18 by operating the CPS model 41, and transmitting the model object 18 to the control server 30 by the CPS server 40 in response to a request of the control server 30;

an object conversion step (S12) of generating, by the control server 30, a camera object 15 by processing the transmitted model object 18;

a basic output step (S21) of transmitting the model object 18 and the camera object 15 by the control server 30 in response to a request for a viewing program of the computer 10 and outputting both the model object 18 and the camera object 15 by the viewing program;

a point selection step (S30) of transmitting, as the camera object 15 is selected, identification information among characteristic information of the camera object 15 to the control server 30 by the viewing program of the computer 10; and a video output step (S40) of transmitting video information 17 corresponding to the identification information to the computer 10 by the control server 30, and outputting the video information 17 by the viewing program of the computer 10.

2. The method according to claim 1, wherein at the point selection step (S30), when the viewing program of the computer 10 transmits the identification information and collimation information among the characteristic information of the camera object 15 to the control server 30 as the camera object 15 is selected, the control server 30 transmits the identification information and the collimation information to the CPS server 40, and the CPS server 40 generates a model object 18 and an area object 16 by operating the CPS model 41 using the identification information and the collimation information and transmits the objects to the control server 30, and at the video output step (S40), the control server 30 transmits the video information 17, the model object 18, and the area object 16 corresponding to the identification information to the computer 10, and the viewing program of the computer 10 outputs the video information 17 into the area object 16.

\*  \*  \*  \*  \*